(12) United States Patent
Tandon et al.

(10) Patent No.: US 12,374,327 B1
(45) Date of Patent: Jul. 29, 2025

(54) UTTERANCE CLASS-BASED INTERFACE AND EXPERIENCE GENERATION

(71) Applicant: Amazon Technologies, Inc., Seattle, WA (US)

(72) Inventors: Akshay Tandon, Seattle, WA (US); Haley Martin, Austin, TX (US); Vaijan M. Hundlekar, Sammamish, WA (US); Avinash Hanumanthappa, Bellevue, WA (US); Marielle Paule Sanna, Seattle, WA (US); Hakem Mohamed Zaied, London (GB); Rajesh Prabhu, Mill Creek, WA (US); Rajat K. Jaggi, Bothell, WA (US); Lyuliang Liu, Bellevue, WA (US); Sayali Nakashe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 18/066,850

(22) Filed: Dec. 15, 2022

(51) Int. Cl.
| | |
|---|---|
| *G10L 15/00* | (2013.01) |
| *G10L 15/183* | (2013.01) |
| *G10L 15/22* | (2006.01) |
| *G10L 15/08* | (2006.01) |
| *G10L 15/18* | (2013.01) |

(52) U.S. Cl.
CPC ........... *G10L 15/183* (2013.01); *G10L 15/22* (2013.01); *G10L 15/08* (2013.01); *G10L 15/1822* (2013.01); *G10L 2015/223* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/1822; G10L 15/183; G10L 15/193; G10L 15/19; G10L 15/14; G10L 15/197; G10L 15/1815; G10L 15/16; G10L 19/005; G10L 19/00; G10L 25/27; G10L 25/30

See application file for complete search history.

(56) References Cited

U.S. PATENT DOCUMENTS 12,183,329 B2 * 12/2024 Song .................. G06F 3/16

* cited by examiner

*Primary Examiner* — Vu B Hang
(74) *Attorney, Agent, or Firm* — Knobbe, Martens, Olson & Bear, LLP

(57) ABSTRACT

Systems and methods are provided for processing and responding to utterances in different ways depending upon the intent and content of the utterances. Different back-end workflows and front-end user experiences may be triggered for utterances that have different intents. For example, if a user is researching high-consideration items for possible acquisition, such as complex technology or new fashion, providing different user experiences depending upon the particular type of utterance can make the research and acquisition process more efficient.

20 Claims, 7 Drawing Sheets

UTTERANCE CLASS-BASED INTERFACE AND EXPERIENCE GENERATION

BACKGROUND

Computing systems can utilize communication networks to exchange data. In some implementations, one computing system, sometimes referred to as a client, requests content over a communication network from another computing system, sometimes referred to as a server. Some computing systems, such as voice-enabled electronic devices, are capable of performing various functions in response to spoken commands. For instance, an individual may speak a command or request, and in response the device may perform various functions and/or cause one or more actions to be performed.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
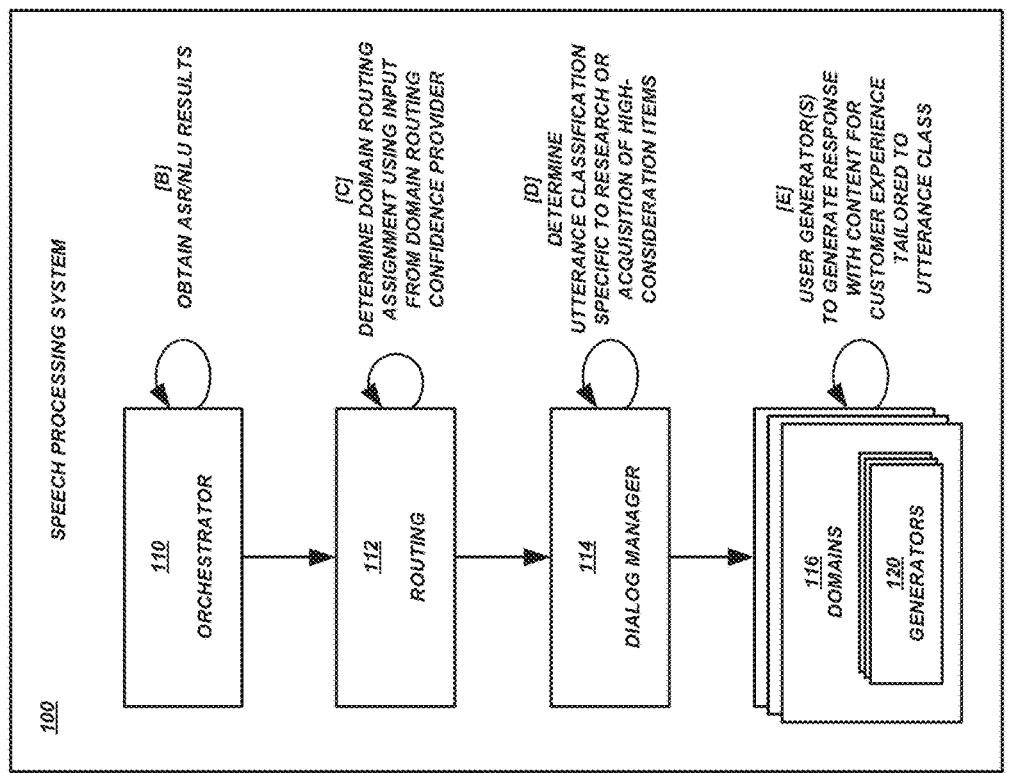
FIG. 1 is a diagram of illustrative interactions between a user device, speech processing system, and various content providers according to some embodiments.
Figure 1:
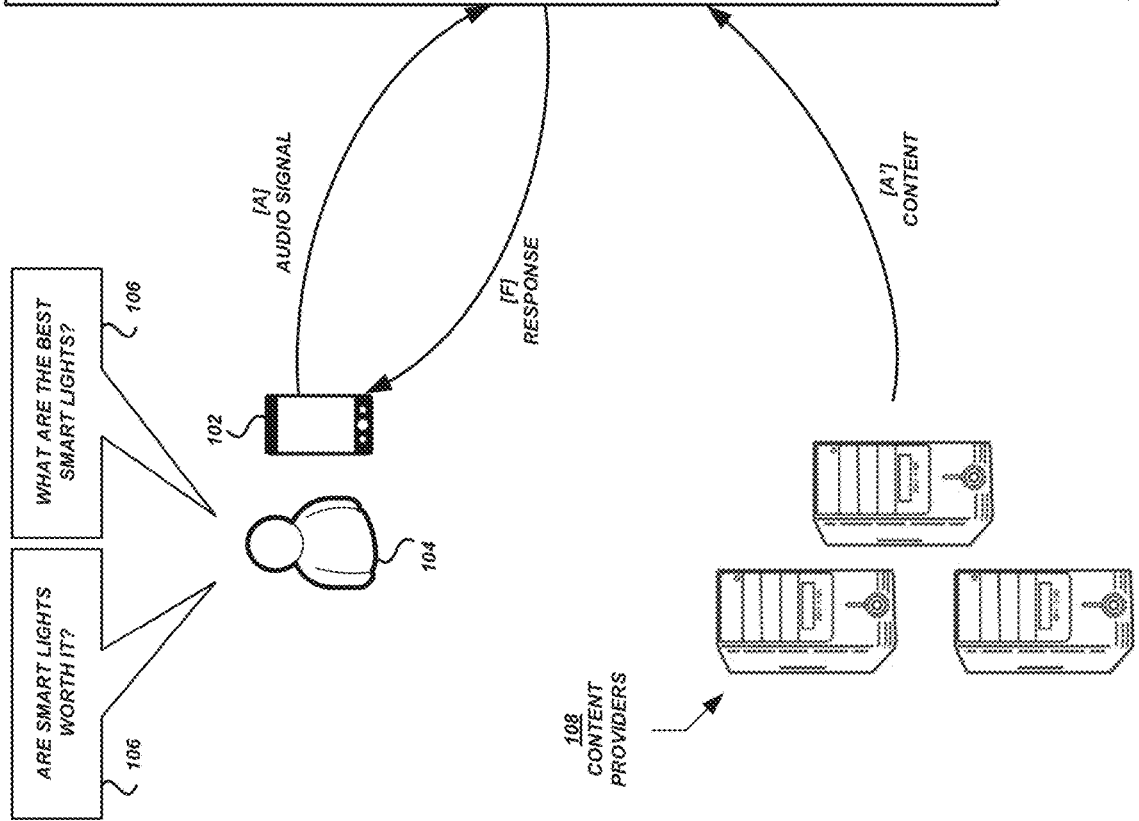

The present disclosure relates to processing and responding to utterances in different ways depending upon the intent and content of the utterances. In some embodiments, different back-end workflows and front-end user experiences are triggered for utterances that have different intents. Beneficially, distinguishing between differences in intent (which may be subtle) and providing different user experiences based thereon can facilitate more productive user interactions with an application or system, such as when a user is expressing interest in complex topics. For example, if a user is researching high-consideration items for possible acquisition, such as complex technology or new fashion, then providing different user experiences depending upon the particular type of utterance can make the research and acquisition process more efficient.

Some speech processing systems process utterances by generating transcripts or other textual representations of the utterances using automatic speech recognition ("ASR"), and then analyzing the textual representations to determine their meaning using natural language understanding ("NLU"). The systems then perform one or more actions based on the determined meanings of the utterances. For example, a system may determine that an utterance relates to searching for an item (e.g., a particular product), and in response the system may obtain and provide a set of search results. However, a user may intend to first research background information and then progress to more specific questions and answers about an item or category of items, before finally browsing items for acquisition. Or, a user may intend only to ask a few specific questions about an item or category of items, and save the acquisition determination for another time. In these and other scenarios, providing a set of search results may not adequately respond to the user's intent and may inhibit future acquisition of an item.

Some aspects of the present disclosure address some or all of the issues noted above, among others, by classifying utterances specific to research or acquisition of high-consideration items, and tailoring user experiences accordingly. A speech processing system may use an utterance classification model to classify utterances into individual utterance classes of a plurality of different utterance classes. By training the model to detect utterance classes specific to different aspects of research or acquisition of high-consideration items, a more effective user experience may be provided than without such utterance classification.

In some embodiments, two or more utterance classes specific to research or acquisition of high-consideration items may be defined, and an utterance classification detection model may be trained accordingly. For example, a first utterance class may generally relate to a request for information about an item or category of items, rather than a request to search for or acquire the item. Such an utterance class may be referred to as a "question class." As another example, a second utterance class may generally relate to a request for recommendations regarding an item or category of items, rather than merely a request to search for examples of the item or category of items. Such an utterance class may be referred to as a "recommendation class." The example utterance classes described herein are illustrative only, and are not intended to be limiting, required or exhaustive. In some embodiments, additional, fewer, and/or alternative utterance classes may be defined, and corresponding user experiences may be tailored thereto.

Additional aspects of the present disclosure relate to generating and managing user experiences tailored to utterance classes related to research or acquisition of high-consideration items. A speech processing system may initiate different workflows to respond to an utterance depending upon the particular utterance class into which the utterances have been classified. Each separate workflow may involve execution of one or more processing components and generation of responsive content to be presented to the user. However, the particular processing components executed, steps of each workflow, and/or structure of the responsive content may be different and tailored to the particular utterance class that triggered the workflow. Advantageously, the triggering of different class-specific workflows can provide users with more efficient and effective experiences, and produce more desirable results for a system such as an online marketplace that is using the speech processing system.

In some embodiments, two or more workflows and corresponding user experiences specific to research or acquisition of high-consideration items may be defined and triggered based on different utterance classes, such as the utterance classes described above. For example, receipt of an utterance classified in a question class may trigger a first workflow (also referred to as an "answer workflow") that involves execution of one or more components to generate an answer that is responsive to a question in the utterance. Illustratively, the answer may be obtained from a pre-existing content item, and may be presented back to the user as a short answer to the question (e.g., one or two sentences). In some cases, additional content may be generated and provided in response to a question, such as suggestions or "hints" about what questions a user may want to ask next or what actions a user may otherwise want to initiate next to continue the research or acquisition experience. As another example, receipt of an utterance classified in a recommendation class may trigger a second workflow (also referred to as a "recommendation workflow") that involves execution of one or more components to provide content options responsive to a request in the utterance. Illustratively, the content options may be links to separate content items, such as articles, videos, or infographics, that provide content relevant to the requested recommendation. Users may activate a link and access the full content item for information regarding the request. In some cases, additional content may be generated and provided in response to a recommendation request, such as hints about what requests a user may want to make next or what actions a user may otherwise want to initiate next to continue the research or acquisition experience.

Various aspects of the disclosure will be described with regard to certain examples and embodiments, which are intended to illustrate but not limit the disclosure. Although aspects of some embodiments described in the disclosure will focus, for the purpose of illustration, on particular examples of utterances, utterance classes, applications, workflows, and user experiences, the examples are illustrative only and are not intended to be limiting. In some embodiments, the techniques described herein may be applied to additional or alternative utterances, utterance classes, applications, workflows, user experiences, and the like. Additionally, any feature used in any embodiment described herein may be used in any combination with any other feature or in any other embodiment, without limitation.

Example User Experience Generation

FIG. 1 is a schematic diagram of an illustrative network environment in which a user 104 makes an utterance 106, a voice-enabled device 102 detects the utterance 106, and a speech processing system 100 determines the meaning of—and manages a user experience in response to—the utterance 106.

In some embodiments, the voice-enabled device 102 may have one or more microphones that are used to capture user speech, such as the utterance 106, one or more speakers that are used to play audio (e.g., computer-synthesized dialogue or other content), one or more displays that are used to present content, etc. The voice-enabled device 102 may also be referred to as a user computing device or a user device. In some embodiments, the voice-enabled device 102 may be portable or mobile. For example, the voice-enabled device 102 may be a handheld device or other mobile device such as a mobile phone or tablet computer. In some embodiments, the voice-enabled device 102 may be designed to operate from a relatively fixed location. For example, the voice-enabled device may be a personal computer (e.g., a desktop or laptop computer), a television or other screen configured with audio input capabilities and network access (e.g., a "smart TV" or "smart display"), or some other electronic device.

The speech processing system 100 may process audio signals received from the voice-enabled device 102 and formulate responses to the user 104. The speech processing system 100 may include various components for providing the features described herein. In some embodiments, the speech processing system 100 may include an orchestrator 110 that obtains ASR results from an ASR subsystem configured to process audio signals or other audio data and generate text data representative of user utterances, and NLU results from an NLU subsystem configured to process text data, determine intents, recognize named entities, and generate semantic representations of utterances. The speech processing system 100 may also include a dialog manager 114 configured to manage dialog flows and determine an utterance class for an utterance. The speech processing system 100 may also include a system of domains 116, at least some of which include or manage one or more response generators 120 (also referred to as "generators" for brevity) to respond to or otherwise act on user utterances, such as by providing requested content, performing requested operations, and the like. The speech processing system 100 may also include a routing subsystem 112 for determining which domain 116 should handle responding to an utterance. In some embodiments, individual domains 116 (or certain subsets thereof) may be associated with a corresponding intra-domain routing system to determine whether particular utterance meaning hypotheses (e.g., combinations of intents and slot content generated by the NLU subsystem) are properly handled by generators 120 or other components of the corresponding domain 116.

Figure 3:
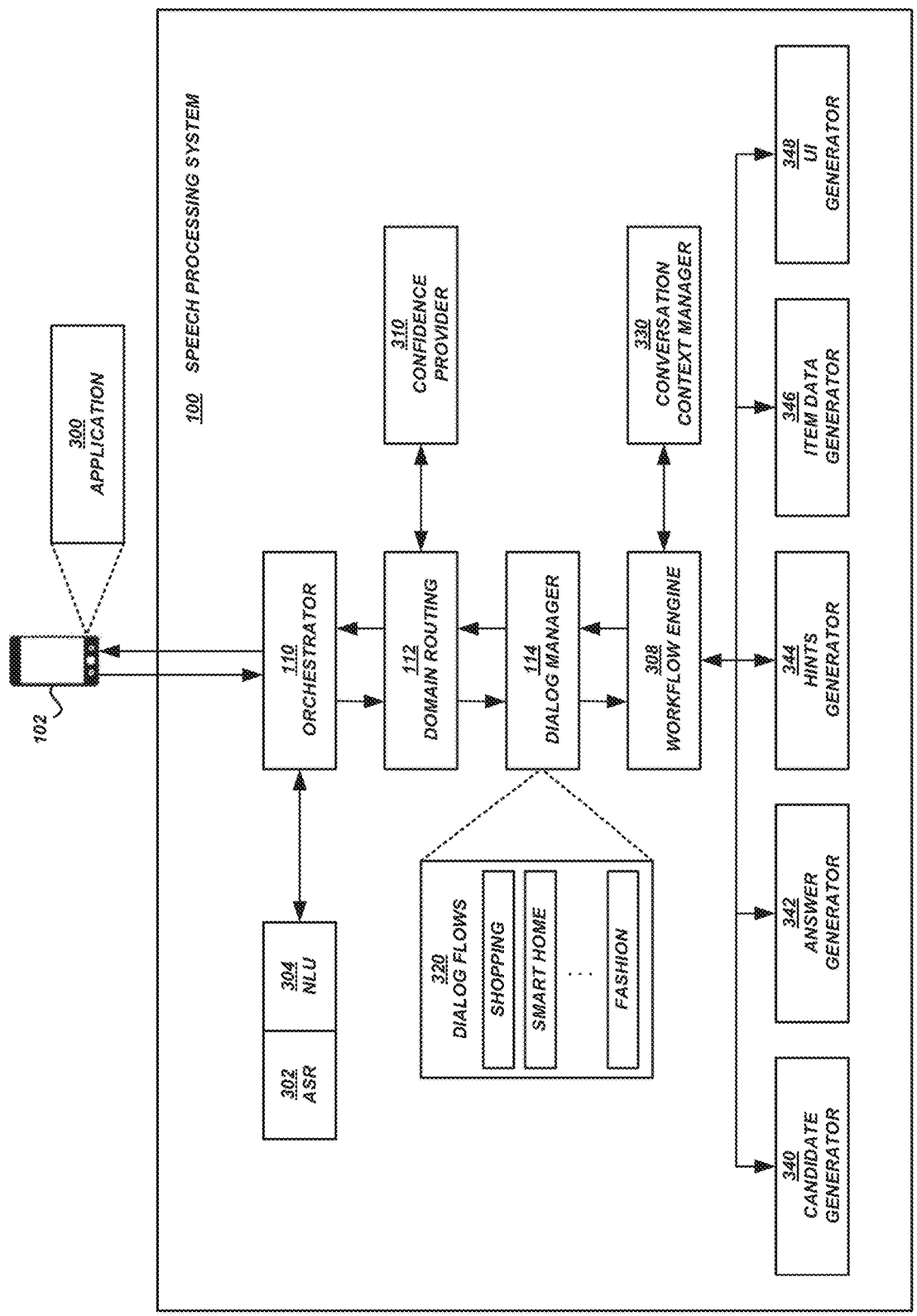
FIG. 3 is a block diagram of an illustrative speech processing system architecture for processing and generating responses to utterances according to some embodiments.

The example subsystems and components of the speech processing system 100 shown in FIG. 1 are illustrative only, and are not intended to be limiting. In some embodiments, a speech processing system 100 may have fewer, additional, and/or alternative components. A specific, detailed example embodiment of the speech processing system 100 is shown in FIG. 3 and described in greater detail below.

The speech processing system 100 may be implemented on one or more physical server computing devices that provide computing services and resources to end-user devices, such as voice-enabled devices 102. In some embodiments, the speech processing system 100 (or individual components thereof, such as the orchestrator 110, routing subsystem 112, domains 116, generators 120, etc.) may be implemented on one or more host devices, such as blade servers, midrange computing devices, mainframe computers, desktop computers, or any other computing device configured to provide computing services and resources. For example, a single host device may execute one or more orchestrators 110, routing subsystems 112, domains 116, generators 120, some combination thereof, etc. The speech processing system 100 may include any number of such hosts.

In some embodiments, the features and services provided by the speech processing system 100 may be implemented as web services consumable via one or more communication networks. In further embodiments, the speech processing system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

As shown in FIG. 1, a user 104 may interact with a voice-enabled device 102 using an utterance 106. The voice-enabled device 102 may detect sound corresponding to the utterance 106 of the user via one or more microphones. In some embodiments, a user may first activate voice interactivity with the voice-enabled device 102. For example, the user 104 may activate a hardware button or dynamic user interface control to initiate voice interactivity. In some embodiments, the utterance 106 itself may initiate voice interactivity. For example, the utterance 106 may include or be preceded by a wakeword or other trigger expression or event (e.g., "Computer!") that is spoken by the user 104 to indicate that subsequent user speech (e.g., "Are smart lights worth it?") is device-directed speech (e.g., speech intended to be received and acted upon by the voice-enabled device 102 and/or speech processing system 100). The voice-enabled device 102 may detect the wakeword and begin streaming audio signals to the speech processing system 100.

With reference to an illustrative example, the user 104 may make an utterance 106 such as "Are smart lights worth it?" or "What are the best smart lights?" While both of these utterances relate to the same category of items (smart home automatization generally, and smart lights in particular), and while both utterances are questions, the utterances relate to different intents of the user 104 and the speech processing system 100 preferably responds to the utterances differently. For example, the utterance "Are smart lights worth it?" is an example of a particular question for which the user 104 is looking for an answer, while the utterance "What are the best smart lights?" is an example of a request for a recommendation. Conventional speech processing systems may interpret the utterances similarly—as requests for content regarding smart lights—and may therefore provide similar responses. In contrast, the speech processing system 100 may advantageously interpret the utterances as being properly classified as different utterance classes, trigger different response workflows, and generate responses with different content and/or follow up options.

At [A], an audio signal representing the user's utterance 106 may be transmitted to the speech processing system 100 for processing and responsive action. In some embodiments, the voice-enabled device 102 may further determine and send additional metadata to the speech processing system 100 that may be used to determine various terms in the utterance 106. For instance, the types of metadata may include data regarding the information currently displayed on a display component (or some other display), sensor data representing the current location and/or environment of the voice-enabled device 102, data about the voice-enabled device 102 (e.g., unique identifier, version, currently-executing application), etc.

At [B], an orchestrator 110 may obtain ASR results and NLU results using the audio signal. Illustratively, the ASR results may include one or more transcripts or other sets of text data representative of words in the utterance 106. In some examples, an ASR subsystem may generate ASR confidence score data representing the likelihood that a particular set of words of the textual data matches those spoken in the utterance 106. For instance, the ASR subsystem may determine a score representing a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR results may be provided to an NLU subsystem, which may generate NLU results data such as a semantic representation of the utterance 106.

At [C], the routing subsystem 112 can obtain routing confidence determinations from various routing confidence providers, and determine which domain the utterance should be routed to for processing. In some embodiments, the routing subsystem 112 may determine which routing confidence providers to obtain routing confidence determinations from based on the NLU results, such as intents, named entities, and the like. For example, a domain 116 may be associated with one or more routing confidence providers, such as one routing confidence provider for each application or subdomain of the domain. Each routing confidence provider may be associated with a set of one or more intents for which the routing confidence provider is to generate routing confidence determinations. The routing subsystem 112 may obtain routing confidence determinations from any or all of the routing confidence providers associated with an intent generated by the NLU subsystem. In some embodiments, a routing confidence determination may be a score indicating a degree of confidence that a corresponding application or subdomain is the proper entity to respond to the utterance.

The routing subsystem 112 may assign the utterance to a particular domain, subdomain, or application for processing based on the routing confidence determination(s). In the present example, the routing subsystem 112 may assign the utterance to a "shopping" domain or "smart home" domain that is configured to handle intents related to research or acquisition of items such as smart lights, as the case may be for the current utterance.

At [D], the dialog manager 114 may determine an utterance class into which the current utterance is to be classified, which may affect subsequent workflows. The dialog manager 114 may have an utterance classification model configured to classify utterances (e.g., using NLU results data) into various utterance classes. In the present example, as described above, the utterance "Are smart lights worth it?" may be interpreted as a question for which a particular answer is desired, and may therefore be classified as a question class. The utterance "What are the best smart lights?" may be interpreted as a request for a recommendation regarding smart lights to be acquired, and may therefore be classified as a recommendation class.

At [E], the domain 116 to which the utterance is assigned may process the utterance and manage an appropriate user experience responsive to the particular utterance class of the utterance. For example, if the utterance class is a question class (e.g., based on an utterance of "Are smart lights worth it?"), then an answer workflow may be triggered in which one or more generators 120 within or associated with the domain 116 are used to produce a response that includes an answer to the question posed by the user 104, and optionally additional hints of what the user 104 may want to ask about next or what functions the user 104 may want to initiate next. As another example, if the utterance class is a recommendation class (e.g., based on an utterance of "What are the best smart lights?"), then a different workflow—a recommendation workflow—may be triggered in which one or more generators 120 within or associated with the domain 116 are used to produce a response that includes links to content items that provide recommendations relevant to the request, and optionally additional hints of what the user 104 may want to ask about next or what functions the user 104 may want to initiate next.

In some embodiments, content that the generators 120 use to produce a response may be obtained from external content providers 108. The speech processing system 100 may obtain content at any time prior to generating a response, indicated as [A']. For example, the speech processing system 100 may contract with any number of content providers 108 to provide content on various topics, such as articles, videos, infographics, or the like. The speech processing system 100 may store the content and provide individual content items or links thereto in response to utterances, as described in greater detail below. In some embodiments, the speech processing system 100 may also or alternatively obtain content from internal content providers.

The example domains, utterance classes, responses, and user experiences described herein are illustrative only, and are not intended to be limiting, required, or exhaustive. In some embodiments, additional, fewer, and/or alternative domains, utterance classes, responses, or user experiences may be used.

At [F], the speech processing system 100 can transmit the generated response, if any, to the voice-enabled device 102, and the voice-enabled device 102 may present the response as needed. Examples of user interfaces and user experiences generated in response to various utterance classes are described in greater detail below.

Example Response Generation Routine

Figure 2:
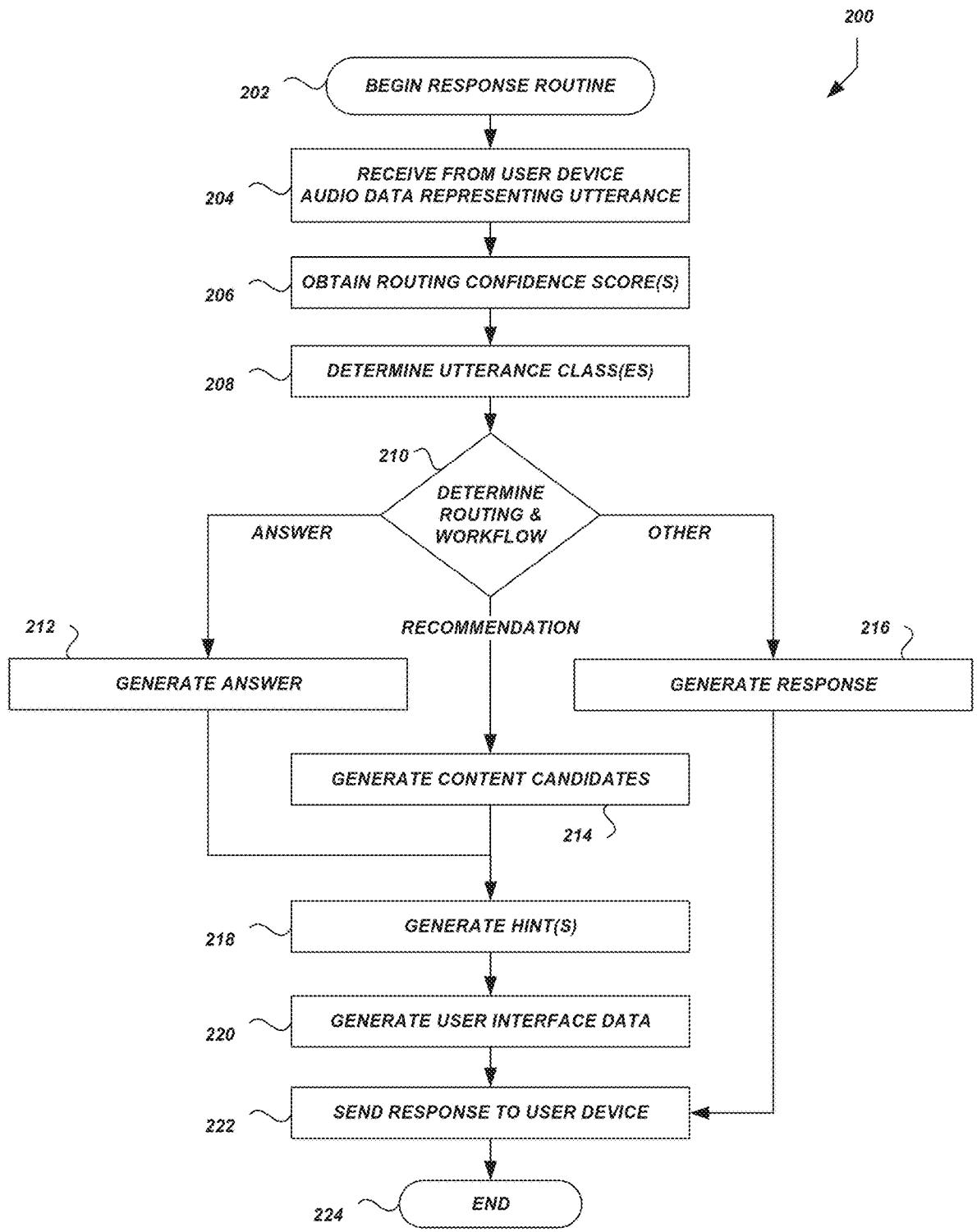
FIG. 2 is a flow diagram of an illustrative routine for processing and generating responses to utterances according to some embodiments according to some embodiments.

FIG. 2 illustrates example routine 200 for responding to utterances by generating user interfaces and managing user experiences based on the class of the utterances. Portions of the routine 200 will be described with further reference to the illustrative speech processing system 100 shown in FIG. 3, and the illustrative user interfaces shown in FIGS. 4-6.

The routine 200 begins at block 202. The routine 200 may begin in response to an event, such as establishment of an interactive speech processing session by a user device 102 with the speech processing system 100. When the routine 200 is initiated, a set of executable program instructions stored on one or more non-transitory computer-readable media (e.g., hard drive, flash memory, removable media, etc.) may be loaded into memory (e.g., random access memory or RAM) of a computing system, such as the computing system 700 shown in FIG. 7, and executed by one or more processors. In some embodiments, the routine 200 or portions thereof may be implemented on multiple processors, serially or in parallel.

At block 204, the speech processing system 100 can receive, from a user device 102, audio data representing an utterance captured by a microphone of (or in communication with) the user device 102. FIG. 3 illustrates an example user device 102 in communication with a speech processing system 100. As shown, the user device 102 may execute an application 300, such as an interactive application configured to communicate with the speech processing system 100, transmit audio data regarding utterances to the speech processing system 100, and present responses received from the speech processing system 100.

As described above, the utterance may be related to research or acquisition of a high-consideration item, such as complex technology, new fashion, expensive goods, or the like. In some cases, the utterance may not be related to research or acquisition of a high-consideration item, and the speech processing system 100 may process the utterance accordingly.

At block 206, the speech processing system 100 can obtain routing confidence scores or other such determinations for one or more domains or individual components thereof. In some embodiments, a domain routing subsystem 112 may determine the domain(s) from which to generate a fulfillment request (e.g., a request for a determination regarding whether the domain or an application thereof is the proper entity to respond to the utterance). In some embodiments, the domain routing subsystem 112 may access a mapping of which domain(s) are configured to handle or are otherwise associated with which semantic representations (e.g., intents) the NLU subsystem 304 is configured to generate. The domain routing subsystem 112 may receive a list of one or more semantic representations for the current utterance 106, such as an N-best list, from the orchestrator 110. The domain routing subsystem 112 may iterate through the N-best list, or a portion thereof, and use the mapping to identify the domain(s) associated with the individual semantic representations. The domain routing subsystem 112 may then generate a fulfillment request for each identified domain, and send the request to one or more routing confidence providers 310 (also referred to simply as "confidence providers") associated with each identified domain. In some embodiments, the routing subsystem 112 may send fulfillment requests to intra-domain routing subsystems associated with each identified domain, and the intra-domain routing subsystems may send requests to one or more confidence providers 310. A fulfillment request may include NLU results data comprising one or more semantic representations mapped to the domain or confidence provider 310 to which the request is sent.

In the present example, the domain routing subsystem 112 may provide fulfillment requests to a confidence provider 310 associated with a particular domain, such a shopping domain, configured to provide user experiences tailored to utterance classes related to research and acquisition of high-consideration items. Each confidence provider 310 in receipt of a fulfillment request can generate one or more routing confidence evaluations. In some embodiments, an intra-domain routing system may employ any number of application-specific confidence providers to obtain assessments of which subdomains (e.g., applications) are appropriate destinations for a particular utterance. For example, an intra-domain routing system for the shopping domain may request routing confidence evaluations from each of a plurality of application-specific routing confidence providers: a first routing confidence provider for a question answering subdomain or application, a second confidence provider for a recommendation subdomain or application, and third routing confidence provider for an online shopping subdomain or application.

In some embodiments, a routing confidence evaluation may be a confidence score representing the confidence of the respective confidence provider 310 that the application associated with provider is the proper application to handle the utterance. The score may be determined using deterministic rules, a statistical model, or a combination thereof. The routing confidence evaluations may be provided to the domain routing subsystem 112.

At block 208, the speech processing system 100 can determine one or more utterance classes for the utterance. As shown in FIG. 3, the speech processing system 100 may include a dialog manager 114 configured to manage various dialogs. To configure the dialog manager 114 to resolve named entities in utterances, map utterances to utterance classes, and otherwise manage dialogs, the dialog manager 114 may be provided with data regarding different dialog flows 320 (e.g., shopping, smart home, fashion, etc.). The data for any given dialog flow may include: sample dialogs with annotations (e.g., samples of utterances annotated to map them to particular utterance classes and responses);

named entities associated with the dialog flow or particular utterance classes; application programming interfaces (APIs) to be executed in response to utterances classified in particular utterance classes; and response templates for presenting responses to utterances classified in particular utterance classes. Each dialog flow may have its own set of utterance classes, or utterance classes may be shared across dialog flows. To classify the utterance, the dialog manager 114 may use an utterance classification model that has been trained to make utterance classification determinations. In some embodiments, the utterance classification model may be trained using training data representing various dialog flows (e.g., using data regarding dialog flows, such as the data listed above or a subset thereof). For example, if "recommend-item" is a specific utterance class, training data may correspond to sentence structures such as "What are the best {Item Name}," "What are the best {Item Category}," "What are the top {Item Name}," "What are the top {Item Category}," etc.

At decision block 210, the speech processing system 100 can determine routing for the utterance class, and a workflow to be executed in response to the utterance class.

In one example, the utterance is a question (e.g., "Are smart lights worth it?") and the dialog manager 114 determines that the utterance class is a "get-answer" utterance class, rather than other utterance classes into which the dialog manager 114 is configured to classify utterances (e.g., a "get-recommendation" utterance class, a "browse-online-item" or "purchase-item" utterance class, etc.). The workflow engine 308 may determine a workflow to generate a response to the "get-answer" classified utterance. For example, the workflow engine 308 may identify one or more generators 120 using a predetermined or dynamically determined mapping of generators 120 to perform operations for such "get-answer" utterances as described in greater detail below beginning at block 212

In another example, the utterance is a request for a recommendation (e.g., "What are the best smart lights?") and the dialog manager 114 determines that the utterance class is a "get-recommendation" utterance class, rather than other utterance classes into which the dialog manager 114 is configured to classify utterances. The workflow engine 308 may determine a workflow to generate a response to the "get-recommendation" classified utterance. For example, the workflow engine 308 may identify one or more generators 120 using a predetermined or dynamically determined mapping of generators 120 to perform operations for such "get-recommendation" utterances as described in greater detail below beginning at block 214.

In a further example, the utterance is a search request (e.g., "Search for smart lights?") and the dialog manager 114 determines that the utterance class is a "browse-online-item" utterance class, rather than other utterance classes into which the dialog manager 114 is configured to classify utterances. The workflow engine 308 may determine a workflow to generate a response to the "browse-online-item" classified utterance. For example, the workflow engine 308 may identify one or more generators 120 using a predetermined or dynamically determined mapping of generators 120 to perform operations for such "browse-online-item" utterances at block 216.

At block 212, the speech processing system 100 can initiate a workflow for generating a response and managing a user experience tailored to an utterance requesting an answer. The workflow may include execution of one or more generators to produce a desired response.

A candidate generator 340 may identify content items to recommend to the user. In some embodiments, the candidate generator 340 may identify and obtain unique recommendations personalized to users (e.g., based on their previous search history). The candidate generator 340 may federate requests to multiple content providers 108.

An answer generator 342 may generate answers to users' questions from content items. In some embodiments, an answer generator may extract or generate a blurb summarizing a content item that is likely to answer or otherwise be relevant to the subject of the question posed in the utterance (e.g., based on named entities recognized in the utterance).

A hints generator 344 may generate recommended follow up questions and hints regarding what a user may request or activate next to further the research or acquisition of high-consideration items. For example, some utterance classes may be mapped (either alone, or in combination with certain named entities) to particular hints to be generated. In some embodiments, the hints may be based on users' interaction history (e.g., prior interactions for a particular category of items).

An item data generator 346 may generate data regarding items. For example, the item data generator 346 may generate item data such as title, price, image, reviews, feature highlights etc.

A user interface generator 348 may use data from other generators to produce a response to the utterance based on the utterance class. In some embodiments, the user interface generator 348 may use a response template associated with the utterance class to build a response.

Each particular utterance class may be associated with a different workflow and a different set of generators to be used to generate a response. In the case of a get-answer utterance class, the workflow that may be triggered may include using an answer generator 342 to identify and produce an answer to the stated question. The answer generator 342 may identify a content item based on information associated with the get-answer utterance class, such as one or more slots of the utterance class. For example, if the slots include entries for "smart lights" and "worth it," the answer generator 342 may identify a content item that explains the value of smart lights. From this content item, the answer generator 342 may extract a short-form answer (e.g., one or two sentences) that appear to directly answer the stated question.

At block 214, the speech processing system 100 can initiate a workflow for generating a recommendation and managing a user experience tailored to an utterance requesting a recommendation. In the case of a get-recommendation utterance class, the workflow that may be triggered may include using a candidate generator 340 to identify and produce one or more content items that are candidates to provide the requested recommendation. The candidate generator 340 may identify content items based on information associated with the get-recommendation utterance class, such as one or more slots of the utterance class. For example, if the slots include entries for "smart lights" and the superlative "best," the candidate generator 340 may identify a set of content items that list and explore various top-selling, top-reviewed, or top-quality smart lights. The candidate generator 340 may create a set of activation controls (e.g., buttons, links, etc.) through which a user can access the content item(s).

At block 216, the speech processing system 100 can initiate a workflow for responding to other utterance classes, if the utterance class is not related to research or acquisition of high-consideration items.

At block 218, the speech processing system 100 can in some embodiments generate hints to be included in the response to the user, along with the content identified or generated as described above. For example, the workflow engine 308 may use a hints generator 344 to generate hints regarding information a user may wish to ask for or actions the user may wish to initiate.

In some embodiments, the hints generator 344 may use a machine-learned model to generate hints depending on the utterance class and context in which the utterance is made. The model may be trained to generate hints (e.g., questions or commands that may be made) based on the utterance class for the current utterance, the context of the current utterance, the user journey leading the current utterance (e.g., prior utterances and/or content interactions), or a combination thereof.

In some embodiments, the hints generator 344 may use rules to determine one or more hints. For example, if the utterance has been classified in the question class, then hints for other related questions may be generated based on the particular question and/or context of the question. As another example, if the utterance has been classified in the question class, then hints for requesting particular types of recommendations may be generated based on the particular question and/or context of the question.

Advantageously, including such hints in the response to the user can facilitate further research and/or lead to an acquisition event more efficiently than merely waiting for a user to proceed unprompted, and potentially without knowing how to formulate an utterance to obtain the desired information or achieve the desired result. Examples of such hints are shown in FIGS. 4 and 5, and are described in greater detail below.

At block 220, the speech processing system 100 can generate user interface data for presentation of a user interface by the use device 102 in response to the utterance. At block 222, the speech processing system 100 can send, to the user device 102, a response to the utterance. The response can be or include data for presentation on the user device 102, such as user interface data generated as described in greater detail below. The routine 200 may then terminate at block 224.

In some embodiments, as described herein, the particular user interface to be presented—and therefore the user interface data to be generated—depends on the generators that have been executed and the overall workflow, which in turn depend on the particular utterance class into which the utterance has been classified.

Figure 4:
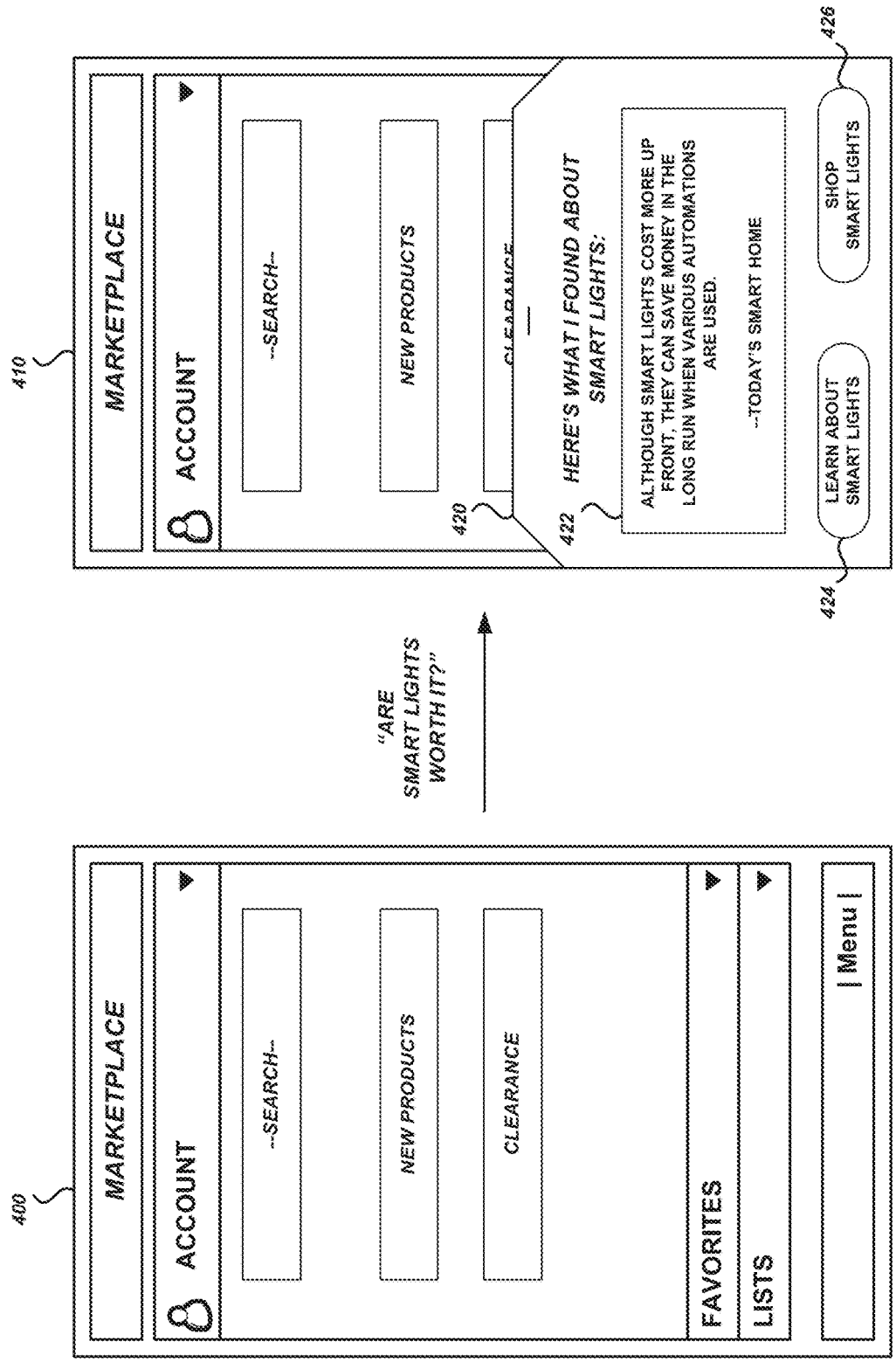
FIG. 4 is a diagram of illustrative user interfaces for presentation of responses to certain types of utterances according to some embodiments.
Figure 5:
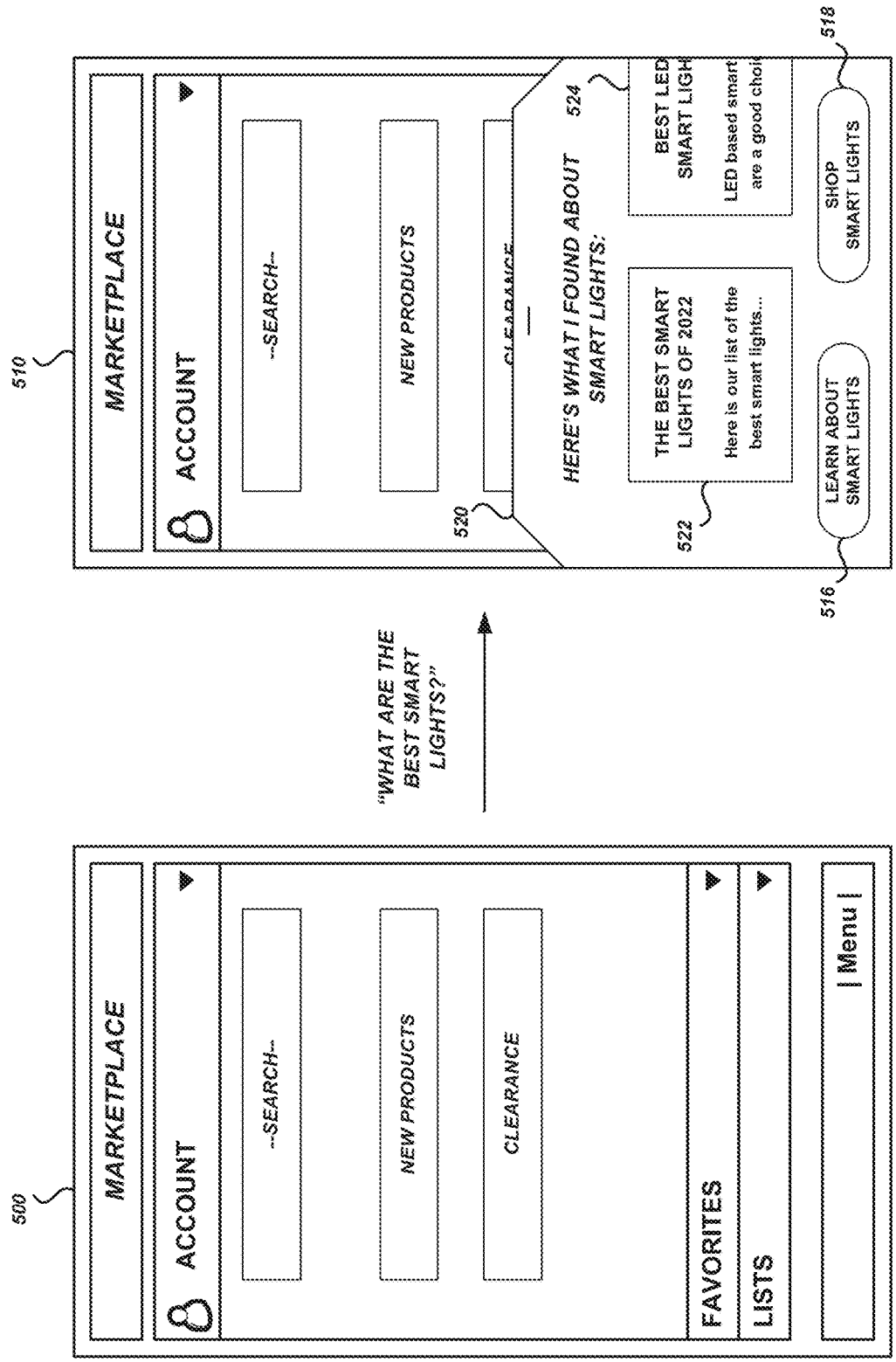
FIG. 5 is a diagram of illustrative user interfaces for presentation of responses to certain types of utterances according to some embodiments.

With reference to an illustrative example, FIG. 4 shows a user interface 410 that may be generated in response to a user's utterance made while a different user interface 400 is displayed. In this example, a user 104 may have used a user device 102 to interact with an application 300 (e.g., a marketplace application). During execution of the application 300 and presentation of user interface 400, the user may have made an utterance such as "Are smart lights worth it?" The application 300 may have been prepared to receive audio data regarding the utterance due to the user activating a control of the application 300 or user device 102 to initiate voice interactivity, or due to the user's initial utterance of a wakeword.

The speech processing system 100 may classify the utterance in the question class, and may initiate generation of an answer workflow to respond to the question. Because the utterance has been classified in the question class, the answer generator 342 may be executed to generate an answer to be presented in the user interface 410. The answer generator 342 may obtain a content item that provides information relevant to the current question, and may extract a short-form answer for presentation. For example, the answer may be limited in terms of the quantity of sentences, words, or characters, depending upon a response template for the interface 410. The answer may further be formatted for presentation in a relatively small portion of the total user interface 410. As shown in FIG. 4, an answer 422 is formatted for display within a dynamically-presented user interface element, such as bottom sheet 420, that is presented in response to the utterance once user interface data is provided by the speech processing system 100 to the user device 102. In some embodiments, the application 300 may be preconfigured to display dynamic user interface elements, such as bottom sheets, to present information received from the speech processing system 100. In such cases, the user interface data that is provided by the speech processing system 100 may include the text of the answer 422, and instructions or labels to indicate that the text is to be presented within the bottom sheet 420.

Figure 6:
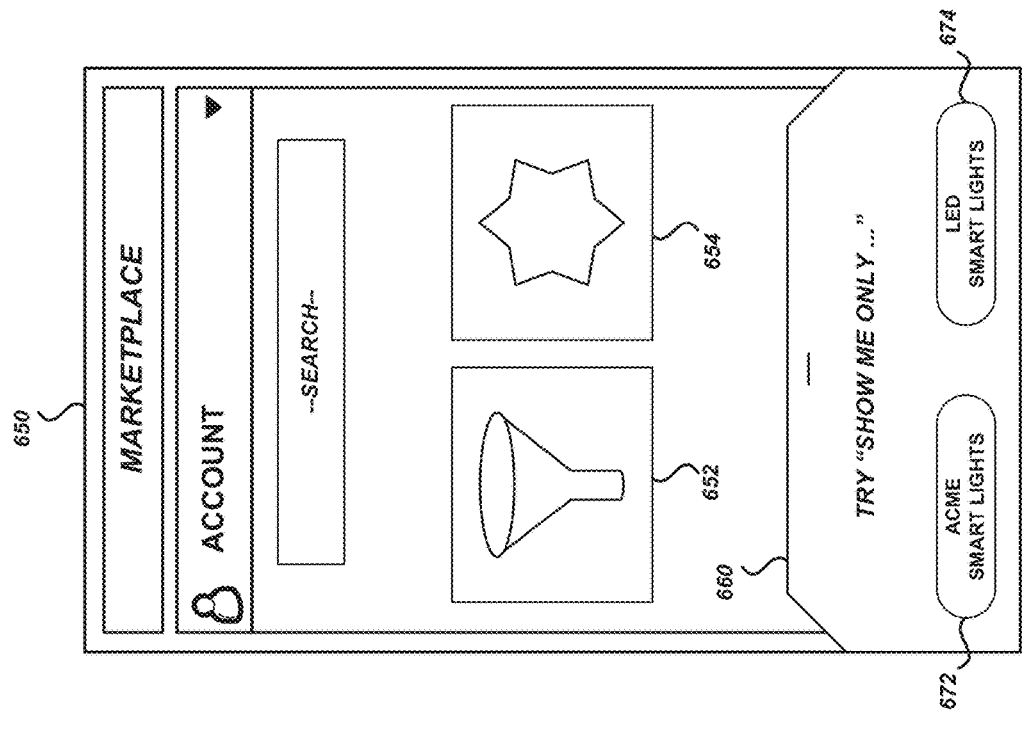
FIG. 6 is a diagram of illustrative user interfaces for presentation of responses to certain types of utterances according to some embodiments.
Figure 6:
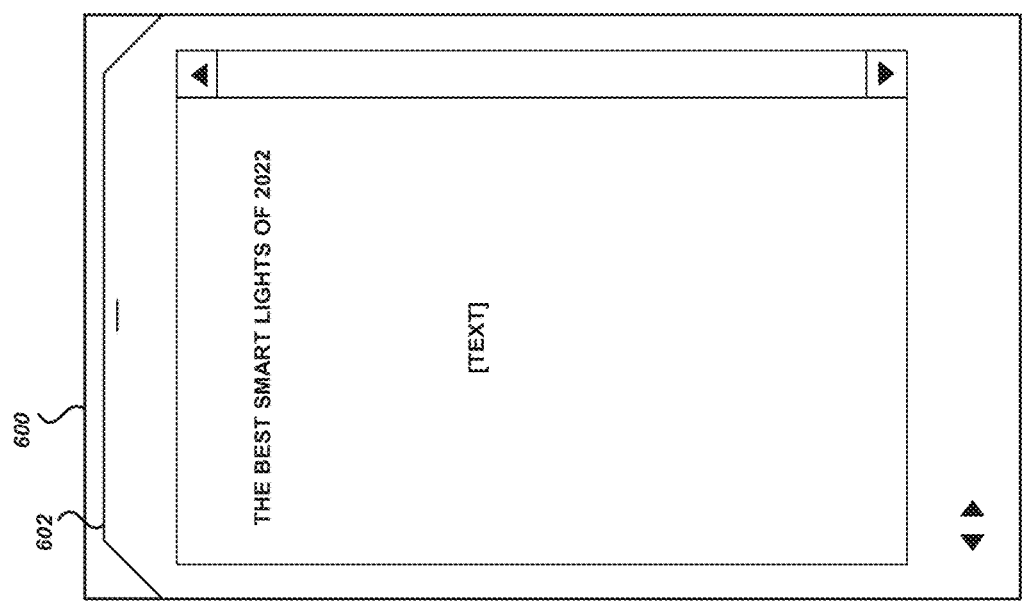

In some embodiments, instead of or in addition to providing an answer 422, the speech processing system 100 may generate and provide hints. Hints may add a degree of dynamic interactivity to the user interface 410 presented in response to the utterance. For example, hints may relate to further questions that a user may ask, further content that the user may access, actions the user may take, etc. As shown in FIG. 4, one hint 424 may prompt the user to learn even more about the queried subject beyond the information provided in the answer 422. Another hint 426 may prompt the user to take action and begin the process of acquiring an item if the answer 422 has satisfies the user's question. The hints 424, 426 may be presented in the dynamically-presented user interface element (bottom sheet 420) as interactive display objects. When a user activates a hint 424 or 426, an action may be initiated and/or another user interface may be presented, as shown in FIG. 6 and described in greater detail below.

With reference to another illustrative example, FIG. 5 shows a user interface 510 that may be generated in response to a user's utterance made while a different user interface 500 is displayed. In this example, a user 104 may have used a user device 102 to interact with an application 300 (e.g., a marketplace application). During execution of the application 300, the user may have made an utterance such as "What are the best smart lights?"

The speech processing system 100 may classify the utterance in the recommendation class (e.g., due at least in part to the presence of the superlative "best" and the lack of a verb such as "shop" or "search"), and may initiate generation of a workflow to respond to the question. Because the utterance has been classified in the recommendation class, the candidate generator 340 may be executed to obtain candidate content items to be presented in the user interface 510. The candidate generator 340 may obtain, from external content providers 108 and/or from an internal data store, one or more content items relevant to the current utterance. For example, a selection of content items may be identified based on semantic scoring of the topics of the content items and the topic of the utterance. Options to access the content items may be formatted for presentation in a relatively small portion of the total user interface 510. As shown in FIG. 5, display objects for content items 522 and 524 are formatted for display within a dynamically-presented user interface element, such as bottom sheet 520, that is presented in response to the utterance once user interface data is provided by the speech processing system 100 to the user device 102.

In some embodiments, the application 300 may be preconfigured to display dynamic user interface elements, such as bottom sheets, to present information received from the speech processing system 100. In such cases, the user interface data that is provided by the speech processing system 100 may include an excerpt from each content item (e.g., a title and initial words of the body), and instructions or labels to indicate that the excerpt is to be presented within the bottom sheet 520.

In some embodiments, instead of or in addition to providing content items 522, 524, the speech processing system 100 may generate and provide hints. As shown in FIG. 5, one hint 516 may prompt the user to learn more about the queried subject beyond the information provided in the content items 522, 524. Another hint 518 may prompt the user to take action and begin the process of acquiring an item. The hints 516, 518 may be presented in the dynamically-presented user interface element (bottom sheet 520) as interactive display objects. When a user activates a hint 516 or 518, an action may be initiated and/or another user interface may be presented, as shown in FIG. 6 and described in greater detail below.

FIG. 6 illustrates example interfaces that may be presented in response to subsequent user utterances or interactions with the interfaces shown in FIGS. 4 and 5. Interface 600 may be presented when a user selects a hint, such as hint 424 or 516, or when a user activates a user interface object for a content item, such as content item 522. A content item may then be displayed, such as in an expanded bottom sheet 602 as shown, in substantially full screen, or in another manner. Advantageously, a user may read and scroll through the content item at their convenience.

Interface 650 may be presented when a user selects a hint, such as hint 426 or 518 to initiate an acquisition process for an item. As shown, examples of the item that was the subject of the original utterance are provided as user interface objects 652 and 654. User interface objects may be displayed in this manner when a user initiates a search and acquisition process using other methods or controls, such as the search field in the interface 650. However, in this example the search is automatically performed when a user activates one of the hints 426 or 518. In addition, because the user has already initiated voice interactivity, additional hints may be provided. For example, bottom sheet 660 may provide hints for additional search options that a user may initiate, such as hint 672 to filter the search results to a particular item brand, hint 674 to filter the search results to a particular item type, etc.

In some embodiments, the user may engage in a multi-turn dialog with the application and thus with the speech processing system 100. In such cases, the processing flow for such utterances may rely on conversation context, such as that managed by a conversation context a manger 330, that keeps track of users' interactions. The context may be used to effectively resume user's searching or other operations. For example, the conversation context a manger 330 may track operations performed during the conversation such as recommendations, refinements, rejections and purchasing etc.

Execution Environment

Figure 7:
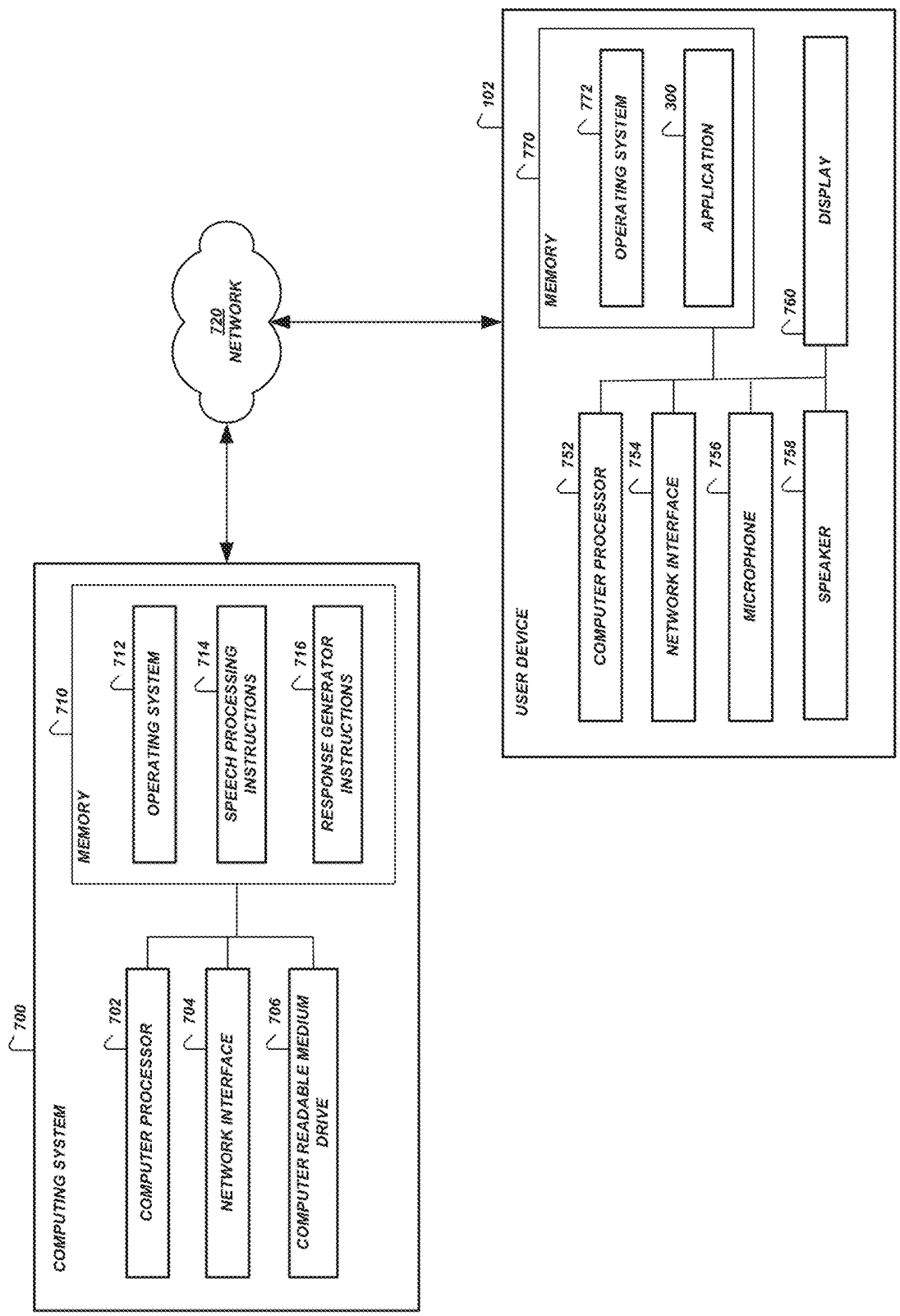
FIG. 7 is a block diagram of an illustrative computing system configured to process and generate responses to utterances according to some embodiments.

FIG. 7 illustrates various components of an example computing system 700 configured to implement various functionality of the speech processing system 100 described herein to process utterances from a user device 102 and generate responses for presentation by the user device 102.

As shown, the computing system 700 and user device 102 may communicate via a communication network 720. In some embodiments, the communication network 720 (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

In some embodiments, the computing system 700 may be implemented using any of a variety of computing devices, such as server computing devices, mainframe computing devices, midrange computing devices, host computing devices, or some combination thereof.

In some embodiments, as shown, a computing system 700 may include: one or more computer processors 702, such as physical central processing units ("CPUs"); one or more network interfaces 704, such as a network interface cards ("NICs"); one or more computer readable medium drives 706, such as high density disks ("HDDs"), solid state drives ("SSDs"), flash drives, and/or other persistent non-transitory computer readable media; one or more input/output device interfaces; and one or more computer-readable memories 710, such as random access memory ("RAM") and/or other volatile non-transitory computer readable media.

The computer-readable memory 710 may include computer program instructions that one or more computer processors 702 execute and/or data that the one or more computer processors 702 use in order to implement one or more embodiments. For example, the computer-readable memory 710 can store an operating system 712 to provide general administration of the computing system 700. As another example, the computer readable memory 710 can store speech processing instructions 714 for processing utterances, such as instructions for determining an utterance class of an utterance (e.g., as a question class, recommendation class, or some other class) and determining which domains, generators, and the like are to be executed in response. As a further example, the computing system 700 can store response generator instructions 716 for generating a response with content for a customer experience tailored to the utterance class.

In some embodiments, as shown, a user device 102 may include: one or more computer processors 752, such as CPUs; one or more network interfaces 754, such as a NICs; a microphone 756; a speaker 758; a display 760, such as a screen; and one or more computer-readable memories 770, such as RAM and/or other volatile non-transitory computer readable media.

The computer-readable memory 770 may include computer program instructions that one or more computer processors 752 execute and/or data that the one or more computer processors 752 use in order to implement one or more embodiments. For example, the computer-readable memory 770 can store an operating system 772 to provide general administration of the user device 102. As another example, the computer readable memory 770 can store an application 300 for presenting content, interacting with the speech processing system 100, and the like.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a user device comprising a microphone and a display; and
a server comprising computer-readable memory and one or more processors;
wherein the server is configured to:
receive, from the user device, audio data representing an utterance occurring during presentation by the user device of a first user interface configured to facilitate acquisition of physical items;
determine an utterance class of the utterance using a model configured to classify individual utterances into individual utterance classes of a plurality of utterance classes, the plurality of utterance classes comprising:
a first utterance class associated with a first response workflow in which an answer to a query for information regarding a physical item is to be presented; and
a second utterance class associated with a second response workflow in which access to a plurality of content items associated with the physical item is to be provided;
generating a second user interface based on the determined utterance class;
generate user interface data for presentation of a second user interface based on the utterance class of the utterance; and
send the user interface data to the user device; and
wherein the user device is configured to:
present, via the display, the first user interface;
generate, using the microphone, the audio data representing the utterance;
send the audio data to the server;
receive the user interface data from the server; and
replace presentation of the first user interface on the display with presentation of the second user interface based on the user interface data.

2. The system of claim 1, wherein the server is further configured to:
obtain training data comprising a plurality of training data inputs and a plurality of corresponding reference data output items; and
train the model using the training data to classify individual utterances into individual utterance classes of the plurality of utterance classes.

3. The system of claim 1, wherein the user device is further configured to:
receive, via the second user interface, input representing activation of a user interface control associated with a first content item of a plurality of content items; and
cause presentation of the first content item.

4. The system of claim 1, wherein the server is further configured to:
identify a second plurality of content items associated with the physical item; and determine a plurality of actions, associated with the physical item, to be presented with options to access the second plurality of content items;
wherein the user interface data further represents options to access the second plurality of content items and the plurality of actions include, in the user interface data.

5. A computer-implemented method comprising:
under control of a computing system comprising one or more computer processors configured to execute specific instructions,
receiving, from a user device, audio data representing an utterance occurring during presentation by the user device of a first user interface;
determining an utterance class of the utterance using a model configured to classify individual utterances into individual utterance classes of a plurality of utterance classes, the plurality of utterance classes comprising:
a first utterance class associated with a first response workflow in which an answer to a query for information regarding an item is to be presented; and
a second utterance class associated with a second response workflow in which access to a plurality of content items associated with the item is to be provided;
generating user interface data for presentation of a second user interface based on the utterance class; and
sending the user interface data to the user device.

6. The computer-implemented method of claim 5, further comprising:
generating a confidence score representing a degree of confidence that the utterance is to be processed in a domain associated with the first utterance class and the second utterance class; and
determining, based on the confidence score, to process the utterance in the domain.

7. The computer-implemented method of claim 5, further comprising:
receiving, from the user device, second audio data representing a second utterance occurring during presentation by the user device of the first user interface;
generating a second confidence score representing a degree of confidence that the utterance is to be processed in a domain associated with the first utterance class and the second utterance class; and
determining, based on the second confidence score, to process the utterance in a domain other than the domain associated with the first utterance class and the second utterance class.

8. The computer-implemented method of claim 5, wherein determining the utterance class of the utterance comprise classifying the utterance in the first utterance class.

9. The computer-implemented method of claim 8, wherein classifying the utterance in the first utterance class is based at least partly on the utterance comprising a question regarding one of a particular item or a class of items.

10. The computer-implemented method of claim 8, further comprising:
determining an answer to a question represented by the utterance; and
determining a plurality of actions, associated with the question represented by the utterance, to be presented with the answer;

wherein generating the user interface data comprises generating the user interface data representing the answer and the plurality of actions.

11. The computer-implemented method of claim 5, wherein determining the utterance class of the utterance comprise classifying the utterance in the second utterance class.

12. The computer-implemented method of claim 11, wherein classifying the utterance in the second utterance class is based at least partly on the utterance comprising a superlative regarding one of a particular item or a particular class of items.

13. The computer-implemented method of claim 12, further comprising:
 identifying a second plurality of content items associated with one of the particular item or the particular class of item; and
 determining a plurality of actions, associated with one of the particular item or the particular class of items, to be presented with options to access the second plurality of content items;
 wherein generating the user interface data comprises generating the user interface data representing options to access the second plurality of content items and the plurality of actions.

14. A system comprising computer readable memory and one or more processors, wherein the system is configured to:
 receive, from a user device, audio data representing an utterance occurring during presentation by the user device of a first user interface;
 determine an utterance class of the utterance using a model configured to classify individual utterances into individual utterance classes of a plurality of utterance classes, the plurality of utterance classes comprising:
  a first utterance class associated with a first response workflow in which an answer to a query for information regarding a item is to be presented; and
  a second utterance class associated with a second response workflow in which access to a plurality of content items associated with the item is to be provided;
 generate user interface data for presentation of a second user interface based on the utterance class; and
 send the user interface data to the user device.

15. The system of claim 14, further configured to:
 generate a confidence score representing a degree of confidence that the utterance is to be processed in a domain associated with the first utterance class and the second utterance class; and
 determine, based on the confidence score, to process the utterance in the domain.

16. The system of claim 14, further configured to:
 receive, from the user device, second audio data representing a second utterance occurring during presentation by the user device of the first user interface;
 generate a second confidence score representing a degree of confidence that the utterance is to be processed in a domain associated with the first utterance class and the second utterance class; and
 determine, based on the second confidence score, to process the utterance in a domain other than the domain associated with the first utterance class and the second utterance class.

17. The system of claim 15, wherein to determine the utterance class, the system is further configured to classify the utterance in the first utterance class based at least partly on the utterance comprising a question regarding one of a particular item or a class of items.

18. The system of claim 17, further configured to:
 determine an answer to a question represented by the utterance; and
 determine a plurality of actions, associated with the question represented by the utterance, to be presented with the answer, wherein the user interface data represents the answer and the plurality of actions.

19. The system of claim 15, wherein to determine the utterance class, the system is further configured to classify the utterance in the second utterance class based at least partly on the utterance comprising a superlative regarding one of a particular item or a particular class of items.

20. The system of claim 19, further configured to:
 identify a second plurality of content items associated with one of the particular item or the particular class of item; and
 determine a plurality of actions, associated with one of the particular item or the particular class of items, to be presented with options to access the second plurality of content items, wherein the user interface data represents options to access the second plurality of content items and the plurality of actions.

* * * * *